Figure 1:
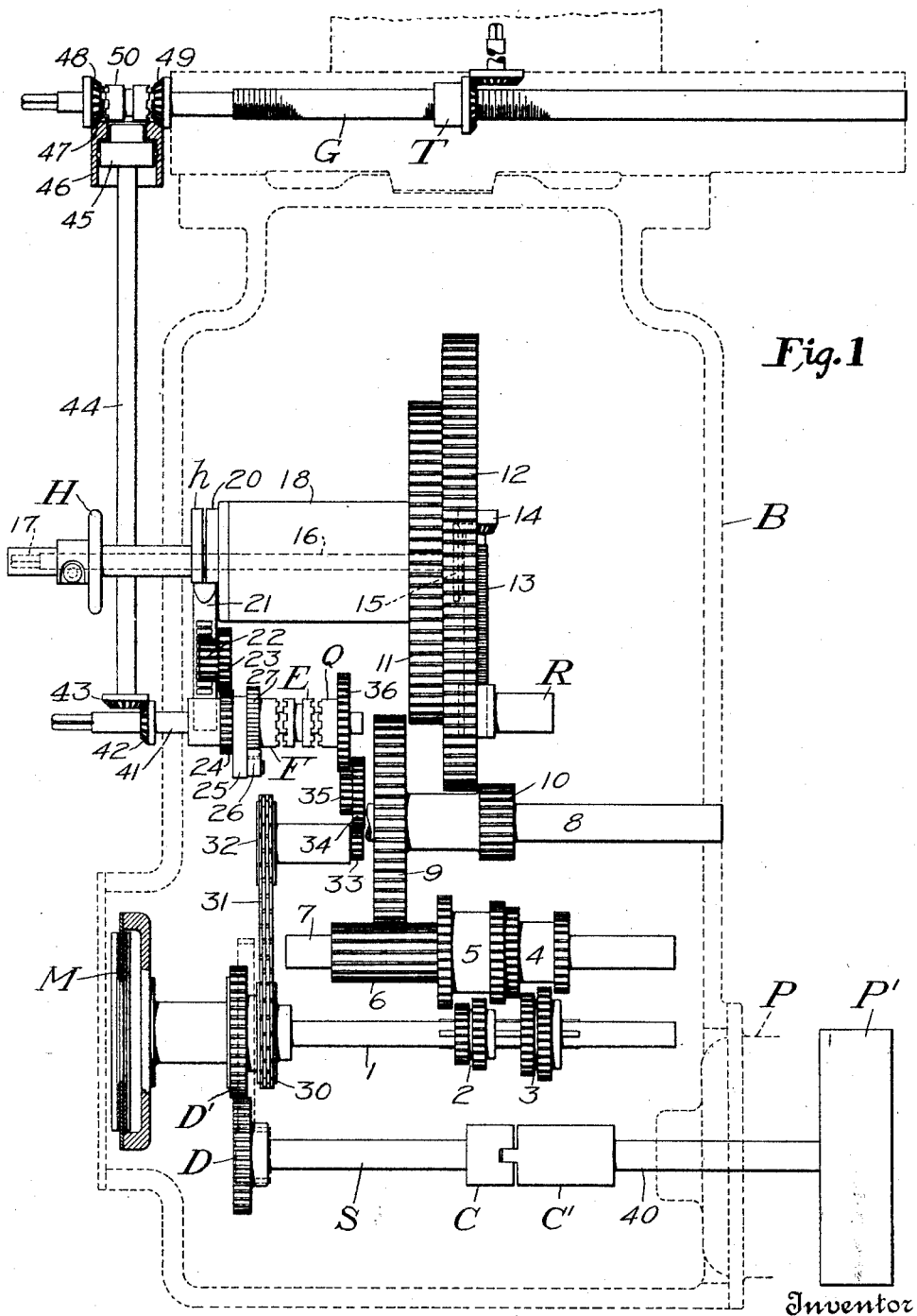

Feb. 23, 1932. W. F. ZIMMERMANN 1,846,297
POWER TRANSMISSION FOR SHAPING MACHINES
Filed June 9, 1928 2 Sheets-Sheet 1

Inventor
William F. Zimmermann
By Attorneys
Nathan & Bowman

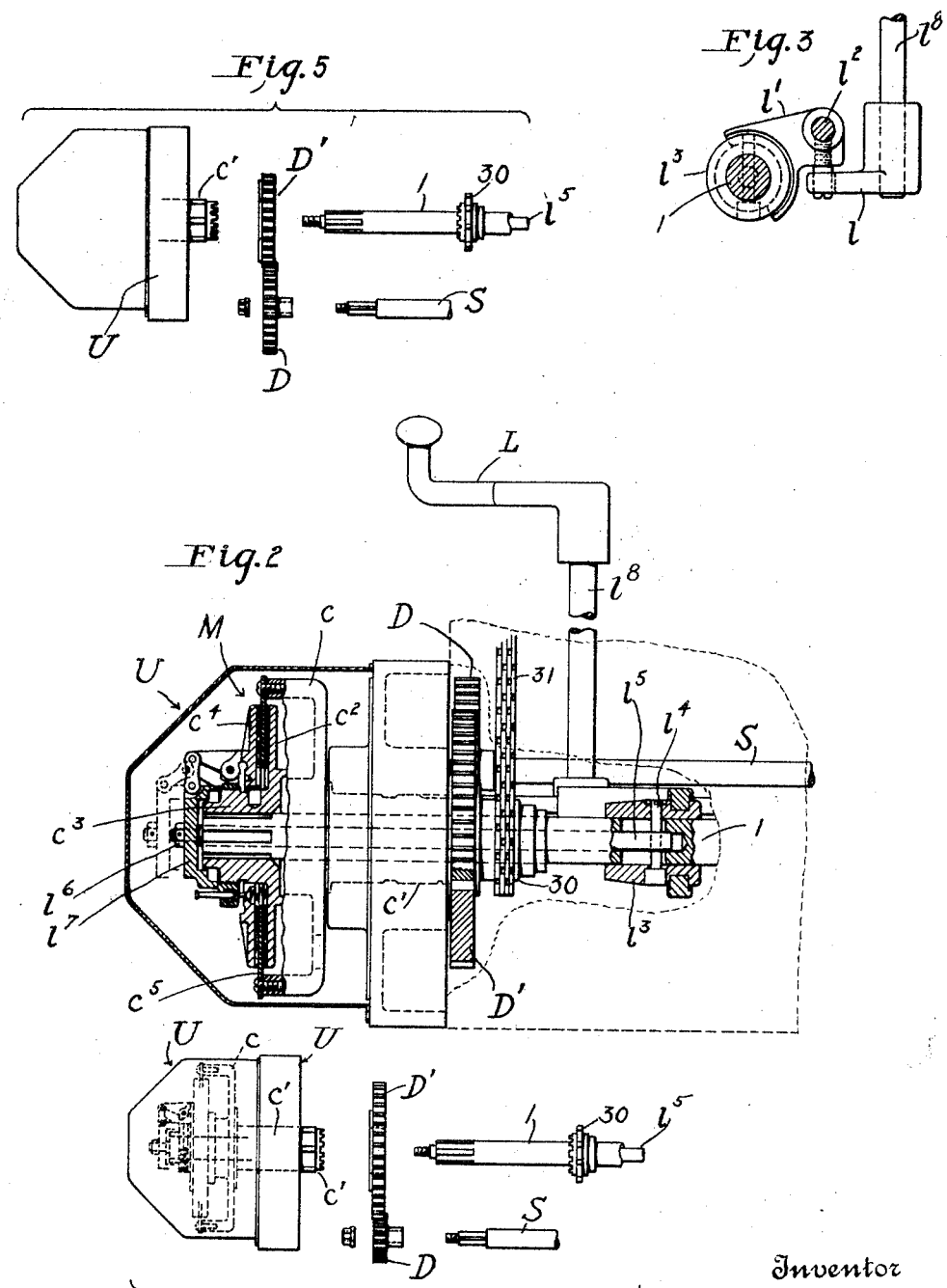

Patented Feb. 23, 1932

1,846,297

UNITED STATES PATENT OFFICE

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY

POWER TRANSMISSION FOR SHAPING MACHINES

Application filed June 9, 1928. Serial No. 284,062.

This invention deals with the transmission system of a shaping-machine and it proposes an arrangement simplified yet providing an ever-available quick-traverse for the work-table while entirely compatible with the need for neatly housing the working elements, and especially the driving motor, in a so-called "built-in" manner.

The designers of shaping machines have habitually located the main clutch in immediate proximity with the main pulley and consequently shapers have heretofore been made with the clutch and pulley both on the same side of the machine. In the earlier days, the prime-driver was always a pulley, but for some time it has been usual to attach an electric motor to the shaper as its prime-driver; depending upon whether the user preferred to derive the power from a counter-shaft, or from an electric circuit. The proper manner of mounting the electric motor, when it is specified, has remained a troublesome problem for the manufacturer because, when it is attached to the machine by a supplemental casing or bracket, the machine occupies increased floor space and is more or less unsightly in appearance.

An object of this invention is to contrive an arrangement enabling the manufacturer readily to transform a stock machine into either a pulley drive type or a motor drive type, at the option of the purchaser, and in either case to possess the very desirable characteristics of a "built-in" prime-driver.

By departing from the previously accepted manner of arranging the transmission, I have found it possible to create a shaper easily convertible as aforesaid. That is to say, I have resorted to what may be regarded as a remote relationship between the clutch (which imparts movement to the ram) and the pulley or motor which serves as the prime-driver; the main transmission being preferably provided with an intermediate coupling so located that the pulley-unit may be interchanged with the motor unit which will then occupy the same space within the main frame or housing. The clutch, according to this conception, will be located on the user's side of the machine; the replaceable prime-driver will be built into the other side; and the main transmission will extend across and within the rear of the main casing and embody a conveniently separable coupling.

There are two factors which this invention likewise provides for; (a) an always-available quick-traverse for the table at a constant speed, and (b) provision for readily adapting the above-mentioned transmission for differently speeded motors, according to the user's circumstances, without departing from the predetermined constant rate of quick-traverse. The clutch unit on the user's side is readily removable for the purpose of enabling a pair of gears to be so changed in ratio that the driving member of the clutch may be maintained at the same speed irrespective of the rate of the particular prime-mover which has been inset. This also means that the driven member of the clutch will, whenever engaged, always run at the same rate and, as it transmits the motion to the ram-actuating transmission, the construction of that transmission may be standardized and requires no alterations to satisfy the rate of the prime-driver.

In the accompanying drawings Figure 1 is a diagrammatic development of a power transmission for shaping machines embodying this invention. Fig. 2 is a detail view partly in section of a removable clutch unit, later to be described, interchangeable driving and driven gears associated with said clutch unit and means for actuating the clutch. Fig. 3 is a detail view showing the connection between the manually actuable clutch shifting shaft and the clutch shifting spool, all later to be described. Fig. 4 is a disassembled view showing the clutch unit removed from its supporting shaft to permit removal of certain driving and driven gears later to be referred to. Fig. 5 is a view similar to Fig. 4 but showing said driving and driven gears replaced by others having a different ratio.

In the annexed drawings, P and P' represent two different substitutable prime-drivers. R is the crank-pin that imparts the reciprocations to the ram. T is the nut that propels the work-supporting table at either the constant quick-traverse or at any of the usual selective feeding rates, as the case may be.

The transmission for revolving the crank-pin R begins with the shaft 1 which derives its motion from the master-clutch M. This transmission is designed on the supposition that the shaft 1 has an invariable speed, when running, irrespective of the intrinsic rate of whichever prime-driver has been inset. Two pairs of slide gears 2 and 3 meshable with two pairs of gears 4 and 5 enable the elongated pinion 6, on the intermediate shaft 7, to run at four selective speeds. The shiftable shaft 8 enables either of the two gears 9 or 10 to be meshed, respectively, with either of the gears 11 or 12 of the bull-wheel. The screw 13, bevel gears 14 and 15, and the rod 16 extended to the manual mean 17 enables the eccentricity, and hence the throw of the ram, to be regulated.

It is also from this transmission that the motion for feeding the work-table is derived, i. e. from the hub 18 of the bull-gear. The particular instrumentality preferably resorted to for transforming the rotary motion of the bull-wheel into the intermittent is not of moment in the present instance inasmuch as the characteristics thereof are fully set forth in co-pending application Serial No. 197,797 filed June 13, 1927, and in Letters Patent No. 1,665,398 issued March 13, 1926.

Of chief interest is the fact that this instrumentality goes to make up a branch-line feed transmission extending from the ram-operating mechanism and ending in the terminal-element F which is diagrammed as a toothed clutch-member. Thereby, whenever the master clutch is closed, the terminal-element F is rotated step-by-step; each pulse being synchronously timed with each revolution of the bull-gear. The amplitude of each pulse is determined by the setting of a hand-wheel H and hence subject to regulation by the user.

The mode of operation of the instrumentality exemplified may be indicated briefly as follows: A rotary cam 20 pushes the rack-plunger 21 always to the same extremity in its advance stroke. An associated stationary cam $h$ (set by the hand wheel H) determines its limit of retreat. The amplitude of stroke of the rack-plunger 21 is thus determined. The gear train 22, 23 and 24 (which operates the pawl-carrier 25) is thereby oscillated through regulatable arcs of stroke, and hence the pawl 26 will intermittently engage and correspondingly advance the ratched wheel 27 which is affixed to the clutch-like terminal element F.

Arranged in opposition to the feed clutch F is the terminal-element Q of the quick-traverse transmission line which is always in motion so long as the prime-driver is operating, regardless of whether the master-clutch is open or closed. This makes the rapid traverse available for shifting the work-table even though the tool-carrrying ram be idle. The rapid traverse line extends along the operator's side of the shaping machine; being encased within the main frame thereof. Its motion is derived from the main-line transmission and preferably from the terminal-element thereof which, in this instance, is the master clutch M which, as will be explained later, is preferably in the nature of a removable unit located at the rear of the machine at the user's side thereof. On that unit, is a sprocket 30 for driving a chain 31 which turns a sprocket 32 and thereby a pinion 33. The latter, through reduction gears 34, 35 and 36, maintains the terminal-element Q at a rapid traverse rate but, it may here be remarked, in a direction opposite to that of the feed-element F.

The nature, location and arrangement of the means for delivering motion from the prime mover to the above-described ram-reciprocating mechanism, feed converting and regulating branch-transmission, and continuous rapid-traverse line, while simple, is of much importance and will now be detailed. It includes a pair of substitutable gears located within the main frame and readily accessible from the operator's side of the machine. These are indicated by D and D′ on the diagram. The gear D is the driver and it is on the near end of a main shaft S which extends transversely partially across the back of the machine; terminating about midway in a coupling member C adapted to be readily engaged by a counterpart coupling member C′ which is on the shaft 40 of the prime-driver P or P′, as the case may be. These three elements constitute a substitutable unit which may be readily removed from or set into an appropriate recess provided by the main frame or housing of the machine; all in what may be termed a "built-in" manner. This avoids the expensive and unsightly expedient heretofore deemed necessary of providing an external supplemental bracket or casing for the motor and of resorting to a special or supplementary transmission for driving the pulley, or a sprocket substituted therefor. It also avoids what has heretofore been a troublesome feature of all such supplemental transmissions, to wit, the need for building them in conformity with various ratios to reduce the differently speeded motors all to a common value at the intake end of the main shaft. In other words, heretofore it has been deemed necessary that the main shaft shall run at an invariable speed irrespective of the speed of the particular motor. According to the present simplification, however, the main shaft is permitted to run at whatever speed the prime-driver delivers, and the correction is provided by the two enclosed gears D and D′ which are readily accessible at the user's side of the machine and admit of being substituted by any pair adapted to gear down or gear up, as the case may be, the speed of the prime-driver to the proper extent.

The gear D', as aforesaid, is splined to the hub c' of a constantly rotating clutch element c forming a part of a removable master-clutch unit U which, being located at the user's side of the machine, places its operating hand lever, L within the immediate reach of the user without requiring the extra and undesirable links, rods or the like which are unavoidable when the clutch itself is located remotely. The gear D is splined to the free end of the shaft S and both the gears D and D' readily may be removed and replaced by others having a different ratio.

It is likewise noteworthy that this general arrangement avoids all need for an extensive or round-about quick-traverse transmission line. As shown, that line is short, direct and located entirely on the user's side of the machine; it extending from the gear 30 to the element 36. In other words, it starts at the driven end of the change gears D and D' and hence its rate remains unaffected by any selection of motor used for the prime-driver.

The master-clutch M includes, in addition to the clutch element c, a disk $c^2$, the hub $c^3$ of which is splined to the forward end of shaft 1, and a disk $c^4$ adapted to be moved by suitable actuating means later to be described toward and from the disk $c^2$ to clamp therebetween a disk $c^5$ carried by the clutch element c. When the disks $c^2$ and $c^4$ grip the disk $c^5$ rotary motion is transmitted from the constantly running gear D' and clutch element c to the shaft 1. The hub $c^1$ of the clutch element c is formed with clutch teeth which engage similar clutch teeth formed on the sprocket 30 whereby the latter is rotated constantly with the former.

As shown in Figs. 2 and 3 the master-clutch M is actuated by a lever L fixed upon an upright shaft $l^8$ which carries, at its lower end an arm $l$ connected with a fork $l'$ slidingly supported on a rod $l^2$. The fork $l'$ engages a spool $l^3$ slidingly mounted on the shaft 1 and is connected, by a pin $l^4$, with a rod $l^5$ mounted in a bore in the shaft 1. To the forward end of the rod $l^5$ is secured, by a nut $l^6$, a clutch actuating cap $l^7$.

How the selective feeds and the converse quick-traverse are transmitted to the work-table, will now be explained. This is done by a single transmission line which serves to convey either the feed motion or the traverse motion, at the option of the user, from the terminal element E to the nut T which propels the table. The element E is a clutch adapted to be shifted by a hand lever to engage either the feed-rate member F or the traverse-rate member Q; the clutch E being splined to a short transverse shaft 41 about which the other two members are journaled.

An external transmission shaft 44 (which in practice is telescopic) extends forwardly along the user's side of the machine and terminates in a motion-reversing unit embodying a safety slip-device; this unit serving to establish connection between the common shaft 41 and the screw G which is journaled in the cross-rail of the shaper. Bevel gears 42 and 43 convey the feed and traverse to the common shaft 44 and the aforesaid unit is indicated on the diagram as comprising two counterpart friction members 45 and 46; the latter carrying a bevel gear 47 meshing simultaneously with bevel gears 48 and 49 journaled on the screw G but adapted, the one or the other, to be connected thereto by a clutch 50 which is splined to that screw and is shiftable by a small hand lever.

Upon studying the diagram, the thorough attainment of a centralized control will become manifest. All of the fundamental clutches and shiftable elements are located at the user's side of the machine. With the exception of the motion reverser which is at the cross-rail, the other shift elements are all within the main-housing (indicated in dotted lines and denoted by B) so that their operating levers can be placed within the immediate grasp of the user without rendering it necessary to resort to a clutter of round-about rods, links, pivots, etc. The frame is symmetrical and provides wide bearing supports for the working elements, and the prime driver, whether motor or pulley, is coupled directly to the primary shaft.

Apart from the substitutable inset prime-mover, the general transmission system is characterized by simplicity, compactness and directness. The rapid-traverse line is short and conveniently disposed and originates at a constant-speed element located near the operator's side of the machine; avoiding the practice of extending it across the rear of the machine to the non-user's side. The ram-operating transmission likewise originates at a clutch-controlled constant-speed element located at the user's side of the machine. The feed-transmission derives its motion from the ram-operating transmission so as to work synchronously with the ram thereof.

A single transmission conveys both the feed and the quick-traverse motions to the cross-rail; serving as a uni-directional common carrier. That is to say, it is uni-directional as to the feed and uni-directional as to the traverse; a motion-reverser at the cross-rail being shifted when it is desired that to change the normal direction the table-transmission is turning when feeding, or when making a quick-return.

By the terms "user's side" or "operator's side", where employed herein, is meant that the side of the machine at which are located the feed-rate changer, the shifter from feed to power-traverse, the direction reverser, and the operating hand-grasps therefor.

Having thus revealed this invention, I claim as new and desire to secure the following combinations and elements, or equivalents thereof, by Letters Patent of United States:—

1. A shaping-machine combining a main-housing; a master-clutch situated at the right side thereof, as viewed from the table side of the machine, a clutch-actuating lever located at the right side of the machine adjacent said master-clutch and operatively connected therewith; a prime-driver detachably inset in the left side of said housing; a main-line transmission including an intermediate separable coupling and extending from said prime-driver to said master-clutch; a ram-operating transmission deriving motion through said master-clutch; and a rapid-traverse transmission permanently deriving motion from said main-line transmission independently of said master-clutch.

2. A shaping-machine combining a main-housing; a detachable prime-driver located at the side of the main-housing remote from the user; a master-clutch situated at the user's side of the machine; clutch-actuating mechanism at the user's side of the machine; a ram-operating transmission deriving motion through said master-clutch; a feed transmission deriving motion through said ram-operating transmission and embodying a rate-changer; a rapid-traverse transmission deriving motion independently of said master-clutch; and a table-propelling transmission embodying a clutch for connecting it with either said feeding or said rapid-traverse transmission and also embodying a motion-reverser.

3. A shaping-machine combining a main-housing; a master-clutch removably secured to said main housing adjacent the user's side thereof; a prime-driver detachably inset in the housing at the side thereof opposite to the side at which the clutch is located; a main line transmission including a drive-shaft and a pair of substitutable gears one of which is removably secured to said drive-shaft and the other of which is removably secured to said master-clutch; a clutch-actuating lever located at the same side of the main-housing as said master-clutch; a ram-operating transmission deriving motion through said master-clutch; and a rapid-traverse transmission permanently deriving, through said substitutable gears, motion from said main line transmission independently of said master-clutch.

4. A shaping-machine combining a main-housing; a master-clutch and a pair of substitutable gears accessibly located and removably supported at the user's side of the machine; a detachable prime-driver for imparting motion to said clutch through said gears said prime-driver being located adjacent the side of the machine opposite to that at which the clutch is located; a ram-operating transmission deriving motion through said master-clutch; a feed transmission deriving motion through said ram-operating transmission and embodying a rate-changer; a rapid-traverse transmission deriving motion independently of said master-clutch but dependently of said gears; and a table-propelling transmission embodying a clutch for connecting it with either said feed or said rapid traverse transmission and also embodying a motion-reverser.

5. A shaping-machine combining a main-housing; a primary-shaft arranged transversely in the rear thereof and having a driving gear adjacent the user's side of the machine; a ram-operating transmission comprising a drive-shaft parallel and adjacent said primary-shaft; a removable member having a driven gear meshing with said driving gear; clutch-means located adjacent the user's side of the machine for connecting and disconnecting said member with said drive-shaft; a quick-traverse transmission deriving motion directly from said removable member independently of said clutch-means; a feed transmission deriving motion through said clutch means; a table-propelling transmission; a clutch for connecting it at option with either said feed or said quick-traverse transmission; and a prime-driver connected to rotate said primary shaft.

6. A shaping-machine combining a main-housing; a power-shaft arranged transversely within said housing; a master-clutch located adjacent the user's side of the machine and deriving constant rotary motion from said power shaft; a driver for said power shaft located at the side of the machine opposite to said clutch; a second transverse shaft parallel with said power shaft and connectible therewith through said master-clutch; ram-reciprocating means connected directly to and operated by said second shaft when clutched to the power shaft; intermittent table feed devices synchronized with and operated from said tool reciprocating means located at the side of the machine adjacent the master-clutch and including a feed rate adjuster; a power traverse train connected to and actuated by said master-clutch and located adjacent to said table feed devices; work-table propelling mechanism; means common to both said feed and traverse devices including a motion-reverser to drive said work-table propelling mechanism and located at the side of the machine adjacent to said clutch; devices selectively to connect said power traverse and intermittent feed to said common means said intermittent feed being operative only when said ram-reciprocating means is effective; and means to connect said second shaft and said clutch.

In witness whereof, I hereunto subscribe my name.

WILLIAM F. ZIMMERMANN.